THERMOELECTRIC UNIT COMPRISING INTIMATE LAYERS
OF GALLIUM-INDIUM ALLOY AND ALUMINA
Filed Oct. 11, 1963

A - Metal
B - Oxide Coating - Plasma
C - Liquid Metal
D - Metal

INVENTORS
DANIEL W. LEWIS
PAUL A. TIERNEY
BY
J. F. Shehan
ATTORNEY 3,337,309

THERMOELECTRIC UNIT COMPRISING INTIMATE LAYERS OF GALLIUM-INDIUM ALLOY AND ALUMINA

Daniel W. Lewis, Pittsburgh, Pa., and Paul A. Tierney, Crestwood, Mo., assignors, by mesne assignments, to the United States of America as represented by the Secretary of the Navy Filed Oct. 11, 1963, Ser. No. 315,731
1 Claim. (Cl. 29—183.5)

The present invention relates to thermoelectric devices and in particular to thermocouples of the contact type which have their component elements maintained in surface contact by pressure.

Thermocouples of this general type have their hot and cold junctions formed by mating faces of the metallic thermocouple elements and have presented a long standing problem in overcoming the contact resistance of the mating faces or interfaces of the elements.

As is well understood in the thermocouple art, power is produced by heating one junction of a thermocouple while cooling the other and the greater the temperature difference between the junctions the greater will be the power generated. The temperature of the hot junction of a thermocouple is maintained by keeping it in efficient thermal contact with a heat source or hot core, while the thermocouple cold junction is kept at the desired lower temperature by keeping it in intimate contact with a heat sink or cold core. A direct contact between the metallic surfaces forming the hot and cold junctions cannot be tolerated, for this would result in a parallel connection between the elements whereas a series connection is necessary to obtain a practical production of electrical power. To overcome this, the prior art has used an electrical insulation between thermocouple elements. The electrical insulation, however, must also be a good thermal conductor and this problem has been difficult to overcome.

Mica, for example, is widely used as an electrical insulator but it has several disadvantages when incorporated in thermocouples of the type under consideration in that it does not transfer heat efficiently and consequently causes thermal drops which are sufficiently large to seriously reduce the output of the thermocouple. Practical difficulties have presented problems in the use of mica such as change in chemical composition and disintegration during use. Other sheet insulations have also been tried in thermocouple construction, such as, alumina, alsimag and boron nitride. An inherent disadvantage in the use of any sheet insulation is the presence of an air interface on each side of the sheet, that is, between the core and the insulation and between the insulation and the hot or cold junction, and since air is such a poor thermal conductor, any advantage which might possible be gained by the use of a sheet having a very high thermal conductivity is lost by the thermal resistance of the air interfaces.

Another material which has been suggested for thermocouple use is glass applied in the molten state so that the glass is bonded to the metal and thus displaces air from the interface. In order for this arrangement to be successful, the coefficient of thermal expansion of the glass must be equal to or near that of the metal core and thermocouple junction in order to prevent breakage of the bond during heating and cooling of the generator. The only known glasses having thermal expansions even approaching that of the metals used are those containing alkali metal ions, however, with these ions present, the electrical resistivity of the glass is very low at high temperature and therefore would not provide the required electrical resistivity.

Alumina coatings applied by plasma and flame spray techniques have also been tested for insulation and these have the advantage that they can be well bonded to one face of an element. The other face, for example, that between the insulation and the thermocouple junction still remains. Also, such coatings heretofore applied and tested have had such poor high temperature electrical properties that relatively thick layers had to be applied to give the needed electric strength but these have large resistance to heat transfer. Another disadavntage of alumina insulations applied by plasma spraying is that thin films which are conducive to heat transfer are permeable to liquid contact metals.

The principal object of the invention is to provide a contact thermoelectric element having a minimum of contact resistance between its elements.

It is a further object to provide a contact thermoelectric element having optimum electrical insulating and thermal conducting characteristics.

Another object is to provide a contact thermocouple having an inorganic insulation layer and a conducting liquid between its hot and cold junctions.

Still another object is in the provision of an electrical insulation for thermoelectric elements which is impervious to conductive liquids.

Other objects, advantages and novel features of the invention will become apparent from the following detailed description of the invention when considered in conjunction with the accompanying drawings, wherein.

In each of the figures, A indicates a metallic support or base. B indicates refractory insulating film which is applied to the base. C indicates a metal contact material applied to the insulating film and D indicates a strap through which pressure is applied to form a contact unit which has high thermal conductivity and yet is electrically insulating.

The metal support A and the strap D will be selected from materials of the group, aluminum, silver, iron, stainless steel, nickel, copper and the noble metals.

The refractory insulating film B will be selectced from oxides of the group of aluminum oxide, beryllium oxide, zirconium oxide, titanium oxide and magnesium oxide.

The metal contacts C will be selected from materials of the group, indium, gallium, lead, selenium and bismuth.

Figure 1:
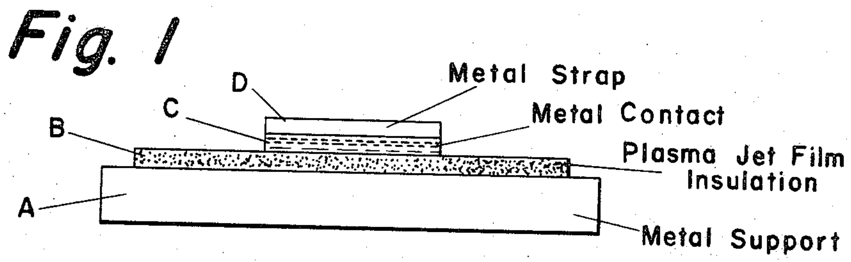
FIG. 1 is an embodiment of the invention which is labelled in a manner to show the broad concept of the invention.
Figure 2:
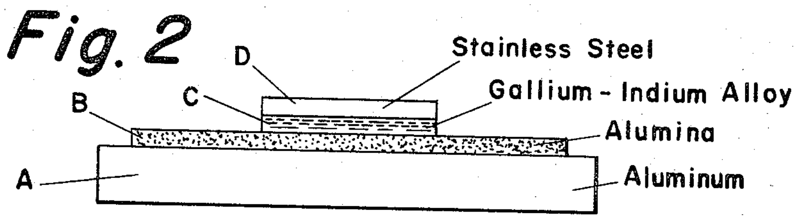
FIGS. 2 and 3 are embodiments similar to FIG. 1 but which are labelled to show examples of the invention formed of selected materials.
Figure 3:
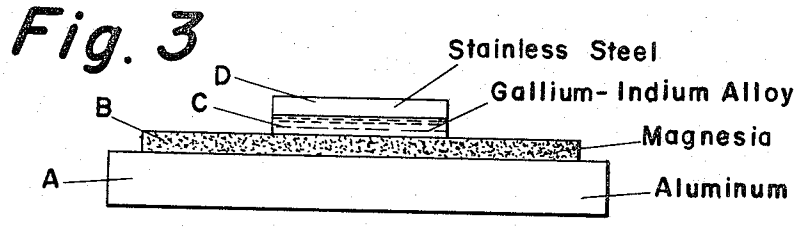

In forming the thermoelectric devices of FIGS. 1, 2 and 3, the refractory insulating material B is of high thermal conductivity and is applied to the surface of support A by means of a plasma jet to form an extremely thin, adherent impervious film. The metal contact C is deposited on the insulating film B in a thin layer and has the characteristic to remain in liquid state at the operating temperatures of upwardly of 300° C. and the metal strap D is compressed on the contact C under pressure of upwardly of 30 p.s.i. to be in intimate contact with the liquid metal.

The insulating film B is applied in the manner explained below in order that a thin heat conducting film may be formed that is impervious to penetration of the liquid contact material C and thus prevent short circuiting with the metal support A. In applying the film B, a stream of gas, such as argon, is passed through an arc in the plasma gun where it is ionized and heated. The oxide powder having a mesh size of not greater than 325 is vibrated into the stream of hot plasma which softens and transports it at such high velocity that it is embedded in the surface of support A. A satisfactory temperature for the jet arc is provided by an amperage of substantially 235 amps and about 28 volts.

*Example I*

In FIG. 2, a 0.0011 inch film B of alumina was applied to an aluminum plate or support A using a plasma gun under the conditions as explained above. Gallium-indium liquid alloy C was then applied to the alumina surface and on top of the alloy a stainless steel strap D was applied under pressure of 30 p.s.i. Thermocouples were inserted into the aluminum plate A and stainless steel strap D in order to measure the temperature drop across the alumina film B and electrical leads were also fastened to these elements A and D in order to measure the change in resistivity of the insulation during aging. After 1700 hours at 330° C., the temperature drop across the insulation while carrying a thermal flux of 33 watts per square inch was only 6° C. The resistivity of the film B after this period of aging was 2.2×10″ ohm-cm. at 300° C. The D.C. breakdown values of 2-mil aluminum films varied from 400 v./mil. at 500° C. to greater than 500 v./mil. at 200° C.

*Example II*

In FIG. 2, a 0.0022 inch film B of magnesia was coated onto an aluminum plate A by plasma jet under conditions similar to Example I. The magnesia surface was wetted with a film C of gallium-indium liquid alloy and the stainless steel strap D was placed on top of the film C under a pressure of 30 p.s.i. With a thermal flux of 39 watts per square inch going through the magnesia film, the thermal drop was 6.25° C. measured at 300° C. At 500° C. the D.C. breakdown of a 2-mil. magnesia film was 400 v./mil. while at 200° C. it was greater than 500 v./mil.

Obviously, many modifications and variations of the present invention are possible in the light of the above teachings. It is therefore to be understood that, within the scope of the appended calims, the invention may be practiced otherwise than as specifically described.

I claim:

A thermoelectric unit which comprises, (a) an aluminum plate providing a base, (b) a film consisting of alumina and having a high thermal conductivity, said film being disposed directly on the upper surface of said plate and being about one to two mils thick, said alumina being applied to said surface in the form of particles having a mesh size not greater than 325 by a plasma gun having its arc maintained at a temperature provided by an amperage of substantially 235 amps and about 28 volts resulting in a softening of said alumina and an embedding of said alumina in said surface, (c) a contact film consisting of gallium-indium alloy disposed directly on said alumina film, (d) a stainless steel strap disposed directly on and in intimate contact with contact film and (e) said contact film having the characteristic of remaining in liquid state at temperatures upwardly of 300° C. and said alumina film being impervious to the penetration of the contact film whereby short circuiting between the aluminum plate and the stainless steel strap is prevented.

References Cited

UNITED STATES PATENTS

| | | | |
|---|---|---|---|
| 2,877,283 | 3/1959 | Justi | 126—201 X |
| 2,916,810 | 12/1959 | Smith et al. | 29—195 |
| 2,952,725 | 9/1960 | Evans et al. | 136—237 X |
| 3,054,694 | 9/1962 | Aves | 29—195 X |
| 3,075,030 | 1/1963 | Elm et al. | 136—208 |
| 3,150,901 | 9/1964 | Esten et al. | 75—134 X |
| 3,183,121 | 5/1965 | Moeller | 136—210 |
| 3,205,296 | 9/1965 | Davis et al. | 136—230 |
| 3,231,965 | 2/1966 | Roes | 136—237 X |

OTHER REFERENCES

Davis et al.: AD240 525, Battelle Memorial Institute Progress Report: Thermoelectric Power Generation, p. 11, November 1960.

Denny et al.: Trans A.I.M.E.-Journal of Metals, January 1952, pps. 39–42.

WINSTON A. DOUGLAS, *Primary Examiner.*

ALLEN B. CURTIS, *Examiner.*

A. M. BEKELMAN, *Assistant Examiner.*